INVENTOR
Nathan C. Price
By George C. Sullivan
Agent

Oct. 17, 1950 N. C. PRICE 2,526,410
ANNULAR TYPE COMBUSTION CHAMBER CONSTRUCTION
FOR TURBO-POWER PLANTS
Original Filed May 22, 1943 2 Sheets-Sheet 2

Inventor
Nathan C. Price
By George C. Sullivan
Agent

Patented Oct. 17, 1950

2,526,410

UNITED STATES PATENT OFFICE 2,526,410

ANNULAR TYPE COMBUSTION CHAMBER CONSTRUCTION FOR TURBO-POWER PLANTS

Nathan C. Price, Los Angeles, Calif., assignor to Lockheed Aircraft Corporation, Burbank, Calif.

Original application May 22, 1943, Serial No. 488,029, now Patent No. 2,468,461, dated April 26, 1949. Divided and this application February 26, 1945, Serial No. 579,757

33 Claims. (Cl. 60—44)

This invention relates to power plants, and relates more particularly to combustion chamber constructions for internal combustion reaction type engines or power plants. This application is a division of my copending application, Serial No. 488,029, filed May 22, 1943, Patent No. 2,468,461, which is a continuation, in part, of my copending application, Serial No. 433,599, filed March 6, 1942.

My copending applications above referred to, disclose gas reaction propulsive apparatus comprising, generally, multi-stage air compressors, a gas turbine, a combustion chamber between the compressor means and turbine, and a nozzle arrangement for providing a reactive propulsive jet. The compressed air is supplied directly from the final stage air compressor to the combustion zone and atomized fuel is introduced into the combustion chamber adjacent its inlet end. It is desirable that there be maximum fuel combustion in the primary combustion chamber, but in practice combustion at this point has been limited to a considerable degree because metallurgical and structural considerations preclude the development of excessively high temperatures which accompany full fuel combustion. It is, therefore, a general object of this invention to provide a practical combustion chamber arrangement for embodiment in power plants of the character above referred to capable of permitting sustained substantially full combustion without excessively heating the fuel injecting elements, the combustion chamber shrouds, walls, etc. The apparatus of the present invention utilizes portions of the air supplied by the air compressor to cool the fuel mixing and injecting elements, and shrouds and chamber walls.

It is another object of the invention to provide combustion chamber construction comprising novel effective fuel and air mixing and injecting means for introducing atomized liquid fuel at constricted portions of Venturi-like entrances of the combustion zone. Streams of atomized liquid fuel and air are directed laterally into the main compressed air streams passing through the restricted portions of the chamber entrances to mix with the air thereof and to be carried forwardly in the combustion zone and burn throughout substantially the entire length of the chamber. The jet means for mixing the liquid fuel and air are shielded and protected against excessively high temperatures by inner shroud elements which conduct relatively cool air past the nozzle and mixing elements, and which also partially define the Venturi shaped main air passages.

A further object of the invention is to provide a combustion chamber construction of the character referred to embodying main shrouds arranged in spaced concentric relation to define the main combustion zone and which are spaced from the housing and other structural elements to leave cooling air passages. The cooling air flowing through these passages shields the housing and principal inner wall of the combustion zone and continues to flow along the surfaces of these parts to form protective boundary layers of relatively cool air for the surfaces which form the mouth of the discharge nozzle of the combustion chamber.

Other objects and advantages of the invention will become apparent from the following detailed description throughout which reference will be made to the accompanying drawings wherein.

Figure 1:
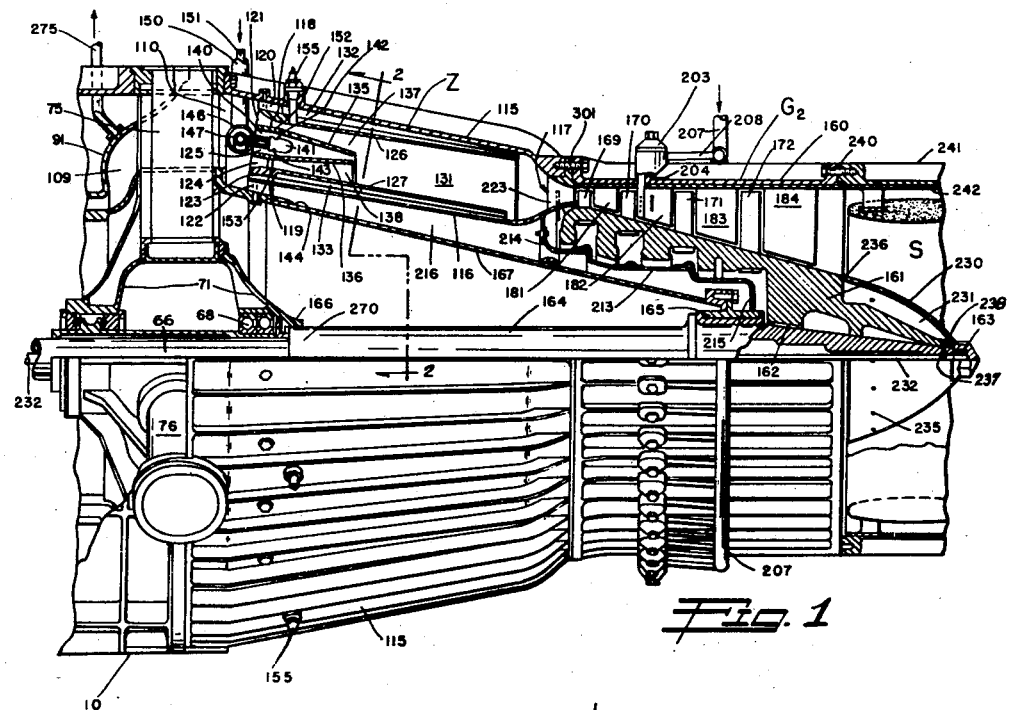
Figure 1 is a fragmentary side elevation of a portion of a power plant showing the combustion chamber and gas turbine with portions of the same appearing in longitudinal cross section.

The combustion chamber construction of the present invention is adapted primarily for incorporation in internal combustion turbopower plants of the class embodying compressor means, a turbine and a combustion chamber interposed between the compressor means and turbine. In the drawings I have shown the combustion chamber Z receiving compressed air from the annular discharge passage 109 of the compressor means and serving to supply the heated gases of combustion and air to the expansion zone of the turbine G. The compressor means (not shown) is contained in a forward housing 10 and has a shaft 66 supported by bearing means 68 carried in bell-shaped housings 71 which in turn are supported in the housing 10 by spaced spokes 75. The shaft 164 of the turbine G₂ to be subsequently described, extends forwardly for connection with the shaft 66 at 270 so that the turbine drives the compressor means. The details of the compressor means are omitted because they are not essential to a complete understanding of the present invention. The above mentioned discharge passage 109 of the compressor leads into the annular inlet 110 of the combustion chamber Z.

Figure 2:
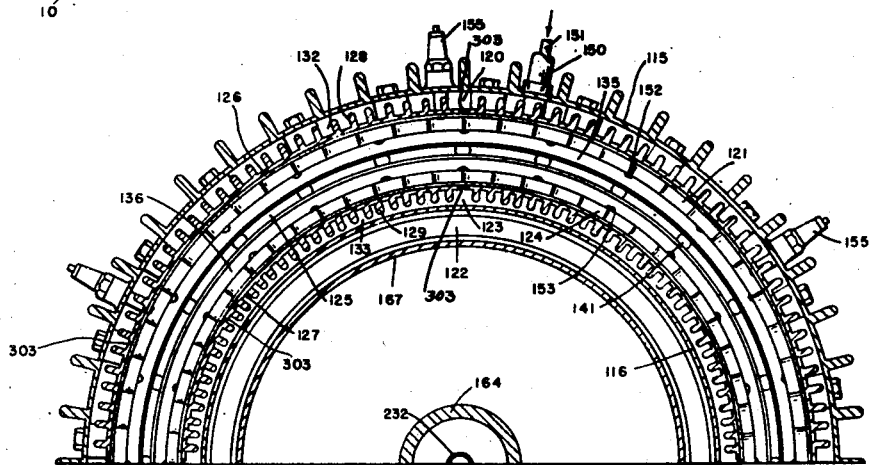
Figure 2 is a partial transverse cross section of the combustion chamber taken as indicated by line 2—2 on Figure 1.

The combustion chamber of the present invention is a substantially annular space of rearwardly diminishing diameter occurring between the discharge passage 109 of the compressor and the gas turbine G₂. The combustion chamber is provided between an externally ribbed tubular pressure-resistant housing 115 and a concentric structural bearing-supporting member or partition 167. As shown in Figures 1 and 2, the surface area of the housing 115 is increased by axially extending external ribs. The housing 115 is a tapering or frusto-conical member and its large forward end is secured to the compressor housing 10 by bolts or screws 300. Similar screws 301 may be employed to secure the reduced rear end of the housing to the gas turbine casing 160. This mode of assembling renders the housing easy of removal for the purpose of inspecting and servicing the internal elements of the combustion chamber. The partition 167 is in the nature of a frusto-conical cantilever member attached at its large end to the housing structure which separates the compressor housing from the combustion zone. The reduced rear end of the member carries the bearing 165 as will be later described. The inner wall of the combustion chamber proper is defined by a tubular partition 116 arranged in surrounding spaced generally parallel relation to the partition member 167. The ribbed housing 115 and the partition 116, forming the walls of the combustion area, are preferably fabricated from heat-resistant material such as a nickel-chromium-iron alloy. The reduced rear portion of the partition 116 is associated with elements of the gas turbine G₂ to be subsequently described, while the forward end of the partition is attached to a ring 119, which in turn is attached to the member 167. The rear portions of the housing 115 and partition 116 are shaped and related so that the combustion chamber Z converges at its rear end to an annular nozzle 117. The nozzle 117 leads to an outlet portion of reduced area, which contains a series of circumferentially spaced airfoil shaped vanes 223.

Concentrically positioned ring structures 118 and 119 are provided in the forward inlet portion of the combustion chamber Z. Suitable screws 305, or the equivalent, secure the ring structures 118 and 119 to the housing 115 and partition 116, respectively. The outer ring 118 has two concentric annular rows of circumferentially spaced openings 120 and 121, and the inner ring 119 has three concentric rows of similar openings 122, 123 and 124. A central annular opening 125 is located between the spaced ring structures 118 and 119. The combustion chamber means further includes a pair of substantially annular spaced concentric shroud members 126 and 127. The member 126 is spaced inwardly from the housing 115, and the wall of the housing and the member 126 are in forward convergent relation. The member 127 is similarly spaced inwardly from the partition 116 and converges rearwardly relative thereto. The shroud members 126 and 127 are elongate tubular parts extending rearwardly from the rings 118 and 119, respectively, to adjacent the aforementioned nozzle 117 to define an elongate annular combustion zone 131. The members 126 and 127 are attached to or joined with the rings 118 and 119 at points between their respective rows of openings and the surfaces of the members 126 and 127 that are external with respect to the combustion zone 131 are provided with closely spaced longitudinally extending radial ribs or fins 128 and 129; see Figure 2. The surface-extending or cooling fins 128 and 129 project into the relatively narrow air passages 132 and 133 between the combustion zone shrouds and the housing and partition walls 115 and 116. The shroud members 126 and 127 are comprised of segments spaced apart circumferentially to allow for thermal expansion and contraction, the gaps or spaces between the segments being shown at 303 in Figure 2.

Figure 3:
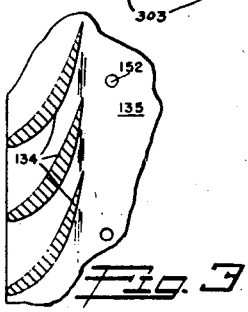
Figure 3 is a fragmentary cross section of a number of the swirl vanes at the entrance of the combustion chamber.

The above described rows of openings 120 and 123 serve to connect the main air inlet passage 110 with the cooling air passages 132 and 133 and are defined by radial airfoil shaped webs or vanes of the ring structures 118 and 119. The openings 121 and 124 are defined by radially disposed airfoil shaped swirl vanes 134 arranged at an angle to the longitudinal axis of the assembly as shown in Figure 3. The air passed or circulated through the cooling passages 132 and 133 is given an axial direction while the air entering the air passages 137 and 138 is given a rotary or swirling motion by the vanes 134. It will be observed that the air moving through the passages 132 and 133 effectively cools the shroud members 126 and 127 as well as the housing wall 115 and the partition 116. Further, the cooling air issuing from the nozzle ends of the gradually restricted passages 132 and 133 flows along the surfaces of the housing 115 and the partition which form the nozzle 117, to constitute protective cooling layers for these surfaces.

Figure 4:
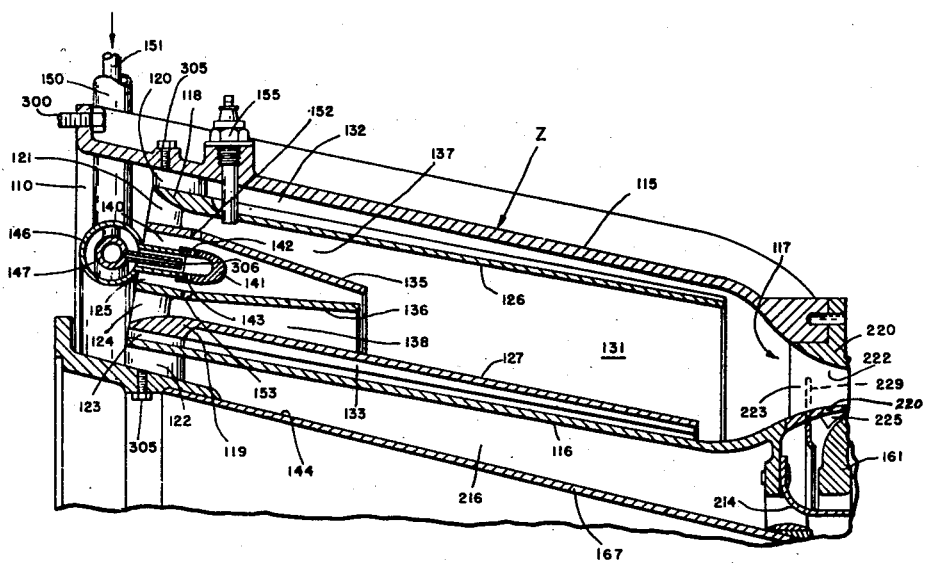
Figure 4 is an enlarged longitudinal detailed sectional view of a portion of the combustion chamber of this invention.

The combustion means further includes a second pair of spaced concentric tubular shroud members 135 and 136 extending rearwardly from the inner margins of the above described central annular opening 125. The members 135 and 136 are secured to and carried by the rings 118 and 119 respectively, and extend rearwardly therefrom in spaced relation to the adjacent shroud members 126 and 127, leaving intermediate air passages 137 and 138. The inner shroud members 135 and 136 are convergent so that the intermediate air passages 137 and 138 are of rearwardly increasing capacity. Air is supplied to these intermediate passages 137 and 138 by the vaned openings 121 and 124. The passages 137 and 138 are restricted adjacent the vaned openings so that they are substantially Venturi shaped in cross section as illustrated in Figure 4. The expanding air flowing around the shroud members 135 and 136 effectively cools the intermediate or inner shrouds.

The invention includes fuel injecting means within the annular space or zone defined by the inner shrouds 135 and 136. This means includes a plurality of circumferentially spaced fuel jets extending into the annular space between the pair of intermediate shrouds 135 and 136. The jets are tubular elements terminating at their ends in spray heads 141. The jets or their heads each have a pair of diametrically opposite laterally directed orifices 142 and 143. It is preferred to direct the orifices radially with respect to the combustion chamber assembly as illustrated in Figure 4. A manifold arrangement is provided to supply the jets with liquid fuel and air. A pair of circular manifold pipes 146 and 147 is arranged in the annular duct leading to the entrance of the combustion chamber. The pipe 146 is supplied with air under pressure by a lead-in pipe 150. The pipe 147 is supported within the circular pipe 146 in spaced relation to its walls and is supplied with liquid fuel under pressure by a lead-in pipe 151, which may pass longitudinally through the pipe 150. The tubular jets may be carried directly by the manifold pipe 146 to be supplied thereby with the air under pressure. Nipples 306 project from the fuel manifold pipe 147 and extend rearwardly in the jets. It will be observed that the fuel manifold 147 and the fuel jets 306 are shielded against radiant heat from adjacent parts by the air flow through the manifold 146 and jets. The nipples 306 may be ported between their ends or may have their forward ends open for the discharge of the fuel. The points of discharge of the fuel from the nipples 306 may be spaced axially from the orifices 142 and 143. Radial or lateral orifices 152 and 153 are provided in the walls of the shrouds 135 and 136, respectively, to discharge the atomized fuel and air mixture into the above described passages 137 and 138. The orifices 152 and 153 are substantially opposite or aligned with the orifices 142 and 143, and discharge the mixture of fuel and air into the restricted portions of the passages 137 and 138 at substantially right angles to the general direction of flow therethrough. Thus the fuel and air mixture is introduced into the contracted high velocity portions of the passages at the forward end of the combustion chamber. It will be observed that the fuel introducing nozzles or jets are contained within the air-cooled shroud assembly 135 and 136 and are not subjected to excessively high temperatures.

The means for igniting the air and fuel mixture in the combustion zone comprises one or more glow plugs 155. The glow plugs extend through openings in the wall of the housing 115 and shroud 126 and their shanks are threaded into bosses on the housing. It is preferred to arrange the plugs 155 so that their inner ends are in spaced downstream relation to the fuel mixture orifices 152. The glow plugs 155 are supplied with low tension current and serve to ignite the fuel and air mixture flowing forwardly into the combustion chamber. It is to be understood that the glow plugs 155 are employed to effect the initial ignition of the fuel and air mixture.

The gas turbine G₂ is contained within the housing 160 and comprises a hollow rotor 161 having the general shape of a truncated cone, and is coaxially positioned within the power plant with its end of minimum diameter facing rearwardly in the direction of flow of the propellant gases to form an expansion zone of increasing cross sectional area between said rotor and the inside surface of said housing. The turbine rotor 161 is splined at 162 and bolted at 163 to the end of the hollow shaft 164, which is in turn rotatably supported upon a rear main bearing 165 and a forwardly located auxiliary bearing 166. The rotor shaft main bearing 165 is supported by means of the cantilever housing member 167 described above.

The gas turbine rotor is provided with a plurality of rows of hollow impeller blades or buckets 169—172 constructed of heat resistant, high strength metal such as a nickel-chromium-iron alloy. The impeller blades of the first row are preferably of the impulse bucket type, while the balance of the blades are of the reaction type having cambered airfoil sections. The impulse buckets 169 and the reaction blades 170, 171 and 172 are hollow, as before stated, and are cooled by air supplied from the interior of the rotor shell cavity as described and claimed in my copending application, Serial No. 576,655, filed February 7, 1945.

Rows of turbine intermediates or stator blades 181, 182, 183 and 184 are fixed intermediate the beforementioned impeller blade rows and supported from the inner surface or lining of the turbine housing 160. An intermediate row of specifically constructed stationary vanes is provided with means for injecting fuel into the turbine expansion zone. The fuel is supplied to fuel vaporizing and injecting tubes on the vanes by a supply pipe 207, tubes 208 and unions 203. This fuel injection means is described and claimed in my copending application, Serial No. 578,302, filed February 16, 1945, Patent No. 2,479,777.

A tubular baffle 213 of stepwise diminishing diameter, and spaced from but conforming in form generally, with the inside surface contour of the turbine rotor shell, is attached at 214 to the rearward inner wall of the combustion chamber, and extends rearwardly to a point 215 adjacent the forward end of the rotor cavity. The diverging annular space 216 thus defined between the conical bearing support 167 and the said inner wall 116 of the combustion chamber and the baffle 213 serves to conduct cooling air under pressure from the annular duct 122, at the entrance 110 of the combustion chamber, rearwardly to the inner apex of the turbine rotor cavity adjacent the main bearing 165 and thence forwardly, countercurrent to the propellant gases in the turbine. The air flows along the inner surface of the turbine rotor cavity in contact with the inner ends of the impeller blade roots, and finally reaches the openings in the annular nozzle ring 117 in the outlet from the combustion chamber.

The nozzle ring at the discharge nozzle 117 of the combustion chamber is constructed of a pair of concentric rings 220 with adjacent convex surfaces so shaped and positioned as to form a smoothly curved diverging nozzle passageway 222. Circumferentially spaced vanes 223, each set at an angle with respect to the longitudinal axis of the unit, extend radially between the said inner curved surfaces of the nozzle rings 220.

At the apex of the turbine rotor, a conical cap member 230 encloses a space 231 into which liquid fuel may be injected under pressure by way of a tube 232 which passes within the bore of the hollow turbine shaft 164. Communication between the tube 232 and the said hollow space 231 for flow of the fuel is affected by way of a plurality of peripherally spaced orifices as shown at 237, extending through the walls of the tubing adjacent its rearward end and registering with corresponding radial ducts 238 extending through the extreme rearward point of the turbine rotor body. The conical cap 230 is provided with a plurality of divergingly directed orifices 235 equispaced in its periphery and adjacent its end of greatest diameter where it meets and makes fluidtight connection at 236 with the rotor body 161. Provision is thus made for injection of supplementary fuel into the gases leaving the turbine at this point to consume the excess air entering the propulsive nozzle whereby the thrust of the power plant is augmented, as described and claimed in my copending applications, Serial No. 433,599, filed March 6, 1942, and Serial No. 578,302, filed February 16, 1945, the latter now Patent No. 2,479,777.

Located immediately at the rear of the gas turbine and attached at 240 to the gas turbine housing is the secondary combustion chamber S which comprises a cylindrical housing 241 carrying a refractory lining 242 which may be composed of carborundum or like refractory material. The secondary combustion chamber S is shaped and otherwise adapted to efficiently utilize the kinetic energy of the residual velocity of the gas issuing from the turbine expansion zone so that it will be additive to the kinetic energy of the propulsive jet.

Assuming now, by way of example, that a speed of approximately 900 feet per second relative to the air at 50,000 feet pressure altitude has been attained by the power unit in the aircraft with which it may be associated, the operation of the apparatus of this invention is briefly as follows:

The compressor means are driven by the turbine through shafts 164 and 66 and serve to supply compressed air to the annular duct 109 adjacent the entrance 110 of the combustion chamber Z at a final pressure of approximately 134 pounds per square inch absolute.

At the entrance 110 to the combustion chamber, the compressed air is divided, a major portion flowing through the vaned annular inlets 121 and 124, and through the Venturi shaped annular passages 137 and 138 to the combustion zone 131 in chamber Z. Another portion of the compressed air passes through the annular openings 120 and 123 and thence through the substantially annular clearance spaces 132 and 133 between the ribs of the combustion zone shrouds and the combustion chamber housing. Still another minor portion of the compressed air enters at the central annular opening 125 and flows through the nozzle shaped annular passage between the inner shrouds 135 and 136 which serves to cool the spray nozzle and spray head 141. The balance of the compressed air from duct 110 passes through the openings at 122 and flows down through the tapering, substantially annular passage 216 formed between the conical shaped main bearing support 167 and the inner shroud 116 of the combustion chamber and its baffle extension 213 to the inner apex of the gas turbine rotor cavity adjacent the main rotor bearing 165. From there a portion of the cooling air turns and flows forward along the inner surface of the turbine rotor shell in heat exchange contact with the inner ends of the impeller blade roots and finally is exhausted to the gas turbine expansion zone inlet at the inner nozzle ring 220 where it joins the combustion gases issuing from the combustion zone 131 in chamber Z in laminar flow.

That portion of the compressed air which passes through the Venturi shaped passages 121 and 124 of the entrance to the combustion zone meets and mixes with the atomized spray of fuel projected from the perforations 142 and 143 in the spray nozzle head 141, through the holes 152 and 153 in the inner shroud members 135 and 136. The resultant fuel-air mixture, once ignited by the hot filament of the glow plug 155, continues to burn throughout a substantial length of the combustion zone 131 in chamber Z. The angularly set vanes 134 in the said passages 121 and 124 impart a rapid spiral motion to the aforesaid mixture of the fuel and air issuing through the annular passages 137 and 138, and where this spirally moving mixture meets the axially flowing air from the central and adjacent passageways, rapid and thorough mixing of the fuel and combustion air is effected. The rotation of the burning gases in the combustion zone is preferably in the same direction as that imparted to the combustion gases leaving the turbine inlet nozzle ring 117 whereby a portion of the rotational kinetic energy is conserved.

The heated gaseous combustion products and excess air are continuously released from the combustion chamber through the restricted openings 224 formed between the vanes 223 in the annular nozzle ring 117 and into the initial stages of the gas turbine expansion zone.

The expanded and partially cooled gases from which a portion of the power has been extracted in passing through the gas turbine in the form of rotative torque applied to the turbine shaft 164 is discharged axially from the gas turbine expansion stages into the secondary combustion chamber S and thence out through the nozzle in the form of a rearwardly directed and efficiently expanded high velocity reactive gaseous jet. The propulsive force exerted by the reaction of the gases leaving the said nozzle is the thrust which may be utilized in whole or in part to propel the unit and the vehicle with which it is associated.

When additional thrust is required and at certain times when maximum efficiency of operation of the unit is to be attained, supplementary fuel is injected through the orifices 235 and the fuel injection tubes of the turbine blades 182.

Having described only a typical form of the invention, I do not wish to be limited to the specific details herein set forth, but wish to reserve to myself any variations or modifications that may appear to those skilled in the art or fall within the scope of the following claims.

I claim:

1. In a gas reaction propulsion unit, a combustion chamber comprising a substantially annular shaped enclosure, means to introduce air at the forward end of the enclosure, a pair of spaced substantially concentrically positioned annular shaped refractory shroud members in said enclosure forming an inner annular combustion zone separated from the walls of said enclosure by relatively narrow air spaces, said shroud members each comprising a plurality of circumferentially spaced segments, means to form a fuel and air mixture within said combustion zone adjacent the forward end thereof, and means located in a common plane that is transverse of said enclosure and adjacent one end of said zone for supporting said segments of the shroud members.

2. In a gas reaction propulsion unit, a combustion chamber comprising an approximately annular shaped enclosure, means to introduce air at the forward end and means to discharge heated combustion gases at the rearward end of said enclosure, a pair of substantially concentrically positioned spaced annular shaped refractory shroud members in said enclosure forming an inner annular combustion zone separated from the walls of said enclosure by a pair of surrounding relatively narrow annular air spaces, another pair of substantially concentric annular refractory members positioned within the forward portion of said annular combustion zone in spaced rearwardly divergent relation to said shroud members to therewith define substantially venturi shaped passages, the pair of refractory members forming a relatively short open-ended annular shaped nozzle member, and means in said nozzle member for injecting fuel into said venturi shaped passages.

3. In a gas reaction propulsion unit, a combustion chamber comprising an approximately annular shaped enclosure, means to introduce air at the forward end and means to discharge heated combustion gases at the rearward end of said enclosure, a pair of substantially concentrically positioned spaced annular shaped refractory shroud members in said enclosure forming an inner annular combustion zone separated from the walls of said enclosure by a pair of surrounding relatively narrow annular air spaces, another pair of substantially concentric annular shaped refractory members centrally and coaxially positioned within the forward portion of said annular combustion zone forming a relatively short open-ended annular nozzle member, said other refractory members being in rearwardly convergent relation and being spaced from said shroud members to leave rearwardly flaring entrance passages into the combustion zone, means for introducing fuel into said passages, and means to divide the flow of air entering the combustion chamber to cause one portion of the air carrying admixed fuel to flow through the said annular combustion zone surrounding said nozzle member, another portion of the air free from fuel to flow through the said annular air spaces surrounding said combustion zone, and still another portion of said air to flow through said nozzle member.

4. In a gas reaction propulsion unit, a combustion chamber comprising an approximately annular shaped enclosure, means to introduce air at the forward end and means to discharge heated combustion gases at the rearward end of said enclosure, a pair of substantially concentrically positioned spaced annular shaped refractory shroud members in said enclosure forming an inner annular combustion zone separated from the walls of said enclosure by a pair of surrounding relatively narrow annular air spaces, a pair of substantially concentric annular refractory members positioned within the forward portion of said combustion zone and spaced one from the other to form a relatively short open-ended annular nozzle member, the last named refractory members having intermediate apertures interconnecting the inner annular space within the nozzle with the surrounding portion of the combustion zone, and fuel jets adjacent said apertures and directed to project a mixture of fuel and air through the apertures and into the air stream flowing into said combustion zone.

5. In a gas reaction propulsion unit, a combustion chamber comprising an approximately annular shaped enclosure, means to introduce air at the forward end and means to discharge heated combustion gases at the rearward end of said enclosure, a pair of substantially concentrically positioned spaced annular shaped refractory shroud members in said enclosure forming an inner annular combustion zone separated from the walls of said enclosure by a pair of surrounding relatively narrow annular air spaces, a pair of substantially concentric annular refractory members converging in the direction of flow and positioned within the forward portion of said combustion zone and spaced one from the other to form a relatively short open-ended annular nozzle member, the last named refractory members having intermediate apertures interconnecting the inner annular space within the nozzle with the surrounding portion of the combustion zone, and fuel jets adjacent said apertures and directed to project a mixture of fuel and air through the apertures and into the air stream flowing into said combustion zone.

6. Apparatus according to claim 2 with a plurality of obliquely positioned vanes adjacent the entrance to said combustion zone and intermediate said combustion zone shrouds and said nozzle member to impart a spiral flow pattern to the fuel and air mixture flowing through the annular space of said combustion zone.

7. A combustion chamber for use with a source of air under pressure comprising walls defining an enclosure, one end of the enclosure receiving air under pressure from said source, the other end of the enclosure being adapted to discharge heated gases of combustion, a pair of spaced longitudinally extending shrouds in the enclosure substantially concentric with said walls defining a combustion zone, a pair of inner shrouds spaced between said first named shrouds adjacent said first named end thereof and spaced one from the other to leave an open-ended inner passage for the axial through flow of air, means for imparting a spiral motion to the air entering the combustion zone, and means in said inner passage for introducing fuel into said zone adjacent the first named end of the enclosure, the shrouds being spaced from said walls to leave cooling air passages which receive air under pressure from said source.

8. A combustion chamber for use with a source of air under pressure comprising walls defining an enclosure, one end of the enclosure receiving air under pressure from said source, said walls converging at the other end of the enclosure to define a nozzle for the discharge of the gases of combustion, spaced shrouds in the enclosure substantially concentric with said walls extending from adjacent the first named end of the enclosure toward the nozzle and defining a combustion zone, means for imparting a spiral motion to the air entering said zone, means for introducing fuel into the combustion zone, said shrouds being spaced from said walls to leave relatively narrow passages receiving air under pressure from said source and discharging said air to flow over the portions of said walls which define said nozzle, and means for directing the air for substantially straight flow through said passages.

9. A combustion chamber for use with a source of air under pressure comprising frusto-conical inner and outer walls in spaced substantially concentric relation defining an annular frusto-conical enclosure, the end of largest diameter of the enclosure receiving air under pressure from said source, means for imparting a swirling motion to the air flowing through the enclosure, nozzle means at the smaller end of the enclosure for discharging the gases of combustion, spaced tubular shrouds in said enclosure defining a combustion zone, and means for introducing fuel into said zone.

10. A combustion chamber for use with a source of air under pressure comprising frusto-conical inner and outer walls in spaced substantially concentric relation defining an annular enclosure, one end of the enclosure receiving air under pressure from said source, nozzle means at the other end of the enclosure for discharging the gases of combustion, spaced tubular shrouds in said enclosure defining a combustion zone, a pair of spaced tubular inner shroud walls in said zone adjacent the first named end of the enclosure, and means between and protected by the inner shroud walls for introducing fuel into the combustion zone.

11. A combustion chamber comprising walls defining an annular combustion zone, means for conducting air under pressure to one end of said zone for axial flow therethrough, a pair of tubular shrouds spaced one within the other in said zone adjacent said end and in substantially concentric relation to said walls, air under pressure from said means being free to flow through the annular space between said shrouds, and means for introducing fuel into the combustion zone including an air pressure tube extending into said space, a fuel supply tube extending into said space, and a mixing head in said space receiving air and fuel from said tube and injecting the fuel and air mixture into said zone.

12. A combustion chamber comprising walls defining an annular combustion zone, means for conducting air under pressure to one end of said zone for axial flow therethrough, a pair of tubular shrouds spaced one within the other in said zone adjacent said end and arranged in substantially concentric relation to said walls, air under pressure from said means being free to flow through the annular space between said shrouds, and means for introducing fuel into the combustion zone including an air pressure tube extending into said space, a fuel supply tube extending into said space, and a mixing head in said space receiving air and fuel from said tube, said shrouds having apertures, and said head having orifices for discharging the fuel and air mixture through said apertures into the combustion zone, the air flow through said space serving to cool the shrouds, tubes and head.

13. A combustion chamber comprising walls defining an annular combustion zone, means for conducting air under pressure to one end of said zone for axial flow therethrough, a pair of tubular shrouds spaced one within the other in said zone adjacent said end and arranged in substantially concentric relation to said walls, air under pressure from said means being free to flow through the annular space between said shrouds, the shrouds having apertures, and means for introducing fuel into the combustion zone including manifold means, and fuel jets extending from the manifold means into said annular space and discharging fuel through said apertures.

14. A combustion chamber comprising walls defining an annular combustion zone, means for conducting air under pressure to one end of said zone for axial flow therethrough, a pair of tubular shrouds spaced one within the other in said zone adjacent said end, air under pressure from said means being free to flow through the annular space between said shrouds, the shrouds having circumferentially spaced apertures, annular fuel and air manifold means, fuel and air tubes extending from the manifold means into said annular space, and mixing jets associated with said tubes for discharging mixed air and fuel through said apertures into the combustion zone, the air flow through said space serving to shield and cool annular manifold means, tubes and jets.

15. A combustion chamber comprising walls defining an annular combustion zone, means for conducting air under pressure to one end of said zone for axial flow therethrough, a pair of tubular shrouds spaced one within the other in said zone adjacent said end, air under pressure from said means being free to flow through the annular space between said shrouds, the outermost shroud having an aperture, means in said space for discharging fuel through said aperture into the combustion zone, and fuel igniting means in the combustion zone in adjacent downstream relation to said aperture.

16. A combustion chamber comprising walls defining an annular combustion zone, means for conducting air under pressure to one end of said zone for axial flow therethrough, a pair of tubular shrouds spaced one within the other in said zone adjacent said end, air under pressure from said means being free to flow through the annular space between said shroud walls, the outermost shroud wall having an aperture, means in said space for discharging fuel through said aperture into the combustion zone, and an electrical glow plug in the combustion zone in adjacent downstream relation to said aperture.

17. A combustion chamber comprising an outer pressure resistant tubular wall, a concentric tubular structural wall within and spaced from the outer wall, said walls defining an enlongate annular enclosure, a pair of tubular shrouds spaced one within the other within said enclosure and arranged in substantially concentric relation to said walls to define an annular combustion zone, each of said shrouds being spaced from a wall to leave an annular cooling passage, means for conducting air under pressure to one end of the enclosure to pass axially through said zone and passages, an annular nozzle member spaced between the forward portions of said shrouds, means in the nozzle member for introducing fuel into the combustion zone, and swirl vanes at the entrance of the combustion zone for imparting a spiral motion to the fuel and air mixture flowing through the zone.

18. In a power plant, two spaced generally cylindrical housings, one being of larger diameter than the other, and combustion chamber means comprising a tubular frusto-conical outer wall extending between said housings, a tubular frusto-conical inner wall spaced within the outer wall to leave an enlongate annular enclosure, said walls being positioned with their ends of largest diameter at the housing of largest diameter, tubular refractory shrouds in said enclosure defining a combustion zone and spaced from said walls to leave cooling passages, means in the housing of larger diameter for forcing air under pressure axially through said zone and passages toward said other housings, means for imparting a swirling motion to said air, and means for introducing fuel into the combustion zone.

19. In a power plant, two spaced generally cylindrical housings, one being of larger diameter than the other, and combustion chamber means comprising a tubular frusto-conical outer wall extending between said housings, a tubular frusto-conical inner wall spaced within the outer wall to leave an elongate annular enclosure, said walls being positioned with their ends of largest diameter at the housing of largest diameter and with their ends of smallest diameter at the other housing, tubular refractory shrouds in said enclosure defining a combustion zone and spaced from said walls to leave cooling passages, means detachably securing said outer wall to the housings so that it may be removed to render the refractory shrouds accessible, means in the housing of larger diameter for forcing air under pressure through said zone and passages toward said other housing, means for imparting a swirling motion to said air, and means for introducing fuel into the combustion zone.

20. Combustion chamber means comprising an outer tubular wall, an inner tubular wall spaced from the outer wall to leave an annular enclosure, a ring attached to the outer wall adjacent one end of the enclosure, a refractory shroud carried by said ring to extend axially in said enclosure and spaced from the outer wall to leave a cooling air passage, a ring carried by the inner wall adjacent said end of the enclosure, a refractory shroud carried by the second ring to extend axially in said enclosure and spaced from the inner wall to leave a cooling air passage, said shrouds being spaced apart to define a combustion zone, means for introducing fuel into said zone, and means for supplying air under pressure to said end of the enclosure.

21. Combustion chamber means comprising an outer tubular wall, an inner tubular wall spaced from the outer wall to leave an annular enclosure, a ring attached to the outer wall adjacent one end of the enclosure, a refractory shroud carried by said ring to extend axially in said enclosure and spaced from the outer wall to leave a cooling air passage, a ring carried by the inner wall adjacent said end of the enclosure, a refractory shroud carried by the second ring to extend axially in said enclosure and spaced from the inner wall to leave a cooling air passage, said shrouds being spaced apart to define an annular combustion zone, an inner shroud carried by each ring within said zone, the inner shrouds being spaced apart to define an inner chamber and being spaced from the first named shrouds, means in said inner chamber for introducing fuel into the combustion zone, and means for conducting air under pressure to said end of the enclosure for passage through said zone, inner chamber and passages.

22. Combustion chamber means comprising an outer tubular wall, an inner tubular wall spaced from the outer wall to leave an annular enclosure, a ring attached to the outer wall adjacent one end of the enclosure, a refractory shroud carried by said ring to extend axially in said enclosure and spaced from the outer wall to leave a cooling air passage, a ring carried by the inner wall adjacent said end of the enclosure, a refractory shroud carried by the second ring to extend axially in said enclosure and spaced from the inner wall to leave a cooling air passage, said shrouds being spaced apart to define a combustion zone, means for introducing fuel into said zone, means for conducting air under pressure to said end of the enclosure for passage therethrough, and swirl vanes on the rings for imparting angular motion to the air entering said zone.

23. Combustion chamber means comprising an outer tubular wall, an inner tubular wall spaced from the outer wall to leave an annular enclosure, a ring attached to the outer wall adjacent one end of the enclosure, a refractory shroud carried by said ring to extend axially in said enclosure and spaced from the outer wall to leave a cooling air passage, a ring carried by the inner wall adjacent said end of the enclosure, a refractory shroud carried by the second ring to extend axially in said enclosure and spaced from the inner wall to leave a cooling air passage, said shrouds being spaced apart to define a combustion zone, means for introducing fuel into said zone, means for conducting air under pressure to said end of the enclosure for passage therethrough, swirl vanes on the rings for imparting angular motion to the air entering said zone, and means for conducting air under pressure to said end of the enclosure for passage through said zone and inner chamber and passages.

24. Combustion chamber means comprising an outer tubular wall, an inner tubular wall spaced from the outer wall to leave an annular enclosure, a ring attached to the outer wall adjacent one end of the enclosure, a refractory shroud carried by said ring to extend axially in said enclosure and spaced from the outer wall to leave a cooling air passage, a ring carried by the inner wall adjacent said end of the enclosure, a refractory shroud carried by the second ring to extend axially in said enclosure and spaced from the inner wall to leave a cooling air passage, said shrouds being spaced apart to define, an annular combustion zone, an inner shroud carried by each ring within said zone, the inner shrouds being spaced apart to define an inner chamber and being spaced from the first named shrouds, means in said inner chamber for introducing fuel into the combustion zone, means for passing air under pressure into said end of the enclosure, and swirl vanes on the rings for imparting angular motion to the air entering said combustion zone.

25. A combustion chamber comprising walls defining an annular combustion zone, means for conducting air under pressure to one end of said zone for axial flow therethrough, a pair of tubular shrouds spaced one within the other in said zone adjacent said end, air under pressure from said means being free to flow through the annular space between said shrouds, a nozzle at the other end of the zone for discharging the gases of combustion, means for introducing fuel into said zone, swirl vanes at the first named end of the zone for imparting angular motion to the air entering zone, and swirl vanes at said nozzle for imparting angular motion to said gases, the first and second named swirled vanes being cambered in the same direction.

26. A combustion chamber comprising walls defining an annular combustion zone, means for conducting air under pressure to one end of said zone for axial flow therethrough, a pair of tubular shrouds spaced one within the other in said zone adjacent said end, air under pressure from said means being free to flow through the annular space between said shrouds, a nozzle at the other end of the zone for discharging the gases of combustion, corresponding end portions of said walls converging to said nozzle means for introducing fuel into said zone, swirl vanes at the first named end of the zone for imparting angular motion to the air entering the zone, and swirl vanes at said nozzle for imparting angular motion to said gases, the first and second named vanes being cambered in the same direction.

27. A combustion chamber comprising inner and outer tubular walls in spaced relation defining an annular enclosure, a pair of spaced substantially concentric refractory shrouds in the enclosure defining a combustion zone, means for conducting air under pressure to the enclosure and zone for axial passage therethrough, a pair of spaced tubular inner shrouds in said zone spaced from the first named shrouds to leave annular passages, the inner shrouds being in axially converging relation so that said passages increase in capacity in the direction of air flow and means between the inner shrouds for introducing fuel into said passages.

28. A combustion chamber comprising inner and outer tubular walls in spaced relation defining an annular enclosure, a pair of spaced substantially concentric refractory shrouds in the enclosure defining a combustion zone, means for conducting air under pressure to the enclosure and zone for axial passage therethrough, a pair of spaced tubular inner shrouds in said zone spaced from the first named shrouds to leave annular passages, the inner shrouds having portions adjacent one end of the enclosure that are substantially concentric with the first named shrouds and portions that converge toward the other end of the enclosure whereby the passages are substantially venturi-shaped, and means between the spaced inner shrouds for introducing fuel into said passages.

29. A combustion chamber for use in a power plant having means for supplying air under pressure comprising walls defining an annular combustion zone, means for conducting the air under pressure to one end of the chamber for passage therethrough, and means for supplying fuel to said zone including a tubular manifold in said end of the zone substantially curved about the longitudinal axis of the zone, spaced tubes extending axially from the manifold, each tube having a discharge orifice, means for supplying air under pressure to the manifold for discharge from the orifices, a tubular fuel manifold within the first named manifold and spaced from the walls thereof to be protected by the air flow therethrough, and fuel tubes extending from the fuel manifold into the first named tubes in spaced relation from the walls thereof to leave restricted air passages therein, the fuel tubes having orifices discharging fuel laterally into the restricted passages to be subjected to a shearing action by the high velocity air flow through said passages.

30. A combustion chamber for use in a power plant having means for supplying air under pressure comprising walls defining an annular combustion zone, means for conducting the air under pressure to one end of the chamber for passage therethrough, and means for supplying fuel to said zone including a tubular manifold in said end of the zone substantially curved about the longitudinal axis of the zone, means for supplying air under pressure to the manifold, a tubular fuel manifold within the first named manifold and spaced from the wall thereof to be protected by air flow through said first named manifold, and means on the manifolds for discharging a mixture of air and fuel into said zone.

31. A combustion chamber for use in a power plant having means for supplying air under pressure comprising walls defining an annular combustion zone, means for conducting the air under pressure to one end of the chamber for passage therethrough, and means for supplying fuel to said zone including a tubular manifold in said end of the zone substantialy curved about the longitudinal axis of the zone, means for supplying air under pressure to the manifold, a tubular fuel manifold within the first named manifold and spaced from the wall thereof to be protected by air flow through said first named manifold, and orifice means on said manifolds having air flow means discharging high velocity air, and fuel orifices related to said flow so the fuel discharged from fuel orifices is subjected to a shearing action by said high velocity air.

32. A combustion chamber for use in a power plant having means for supplying air under pressure comprising walls defining an annular combustion zone, means for conducting the air under pressure to one end of the chamber for passage therethrough, and means for supplying fuel to said zone including a tubular manifold in said end of the zone substantially curved about the longitudinal axis of the zone, spaced tubes extending axially from the manifold, each tube having a discharge orifice, means for supplying air under pressure to the manifold for discharge from the orifices, a tubular fuel manifold within the first named manifold and spaced from the walls thereof to be protected by the air flow therethrough, and fuel tubes extending from the fuel manifold and entering the air tubes with slight clearance to leave high velocity air passages, the fuel tubes having orifices directing fuel into said passages substantially normal to the air flow therethrough, there being mixing chambers in said first named tubes between the fuel orifices and the first named orifices.

33. A combustion chamber comprising a pair of spaced walls defining a passage for receiving air under pressure for axial flow therethrough, a source of air under pressure for continuously supplying air under pressure to said passage for axial flow therethrough, one wall having an aperture therethrough, means behind said wall for continuously projecting a stream of fuel through said aperture into said passage in a direction substantially normal to the direction of air flow therethrough, said means including a fuel jet discharging a stream of fuel through said aperture of smaller diameter than the aperture, and duct means directing air under pressure from said source to behind said wall so that a stream of air flows through the aperture in surrounding relation to the fuel stream.

NATHAN C. PRICE.

REFERENCES CITED

The following references are of record in the file of this patent:

UNITED STATES PATENTS

| Number | Name | Date |
|---|---|---|
| 1,130,090 | Kutschinski | Mar. 2, 1915 |
| 1,650,343 | Good | Nov. 22, 1927 |
| 2,097,255 | Saha | Oct. 26, 1937 |
| 2,117,270 | Bloom | May 17, 1938 |
| 2,268,464 | Seippel | Dec. 30, 1941 |
| 2,326,072 | Seippel | Aug. 3, 1943 |
| 2,332,866 | Muller | Oct. 26, 1943 |
| 2,398,654 | Lubbock et al. | Apr. 16, 1946 |

FOREIGN PATENTS

| Number | Country | Date |
|---|---|---|
| 63,081 | Austria | Jan. 26, 1914 |
| 210,655 | Switzerland | Oct. 16, 1940 |